2,808,396

ALPHA-ALKYLSULFONYLACRYLONITRILES, AND POLYMERS THEREOF

Hubert M. Hill, Kingsport, Tenn., assignor to Eastman Kodak Company, Rochester, N. Y., a corporation of New Jersey No Drawing. Application April 7, 1955, Serial No. 500,013

10 Claims. (Cl. 260—79.3)

This invention relates to alpha-alkylsulfonylacrylonitriles, to polymers thereof, and to a method for their preparation.

The new compounds of the invention are represented by the following general structural formula:

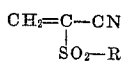

wherein R represents an alkyl group containing from 1 to 4 carbon atoms, e. g. methyl, ethyl, propyl, isopropyl, butyl, sec. butyl, etc. groups. The above defined compounds are valuable intermediates for the preparation of resinous homopolymers and copolymers thereof which are characterized by high softening points and good solubility in common volatile organic solvents. Some of the polymers are useful as adhesives, while certain other copolymers, for example, those with acrylonitrile can be molded, extruded or coated from their solutions to give shaped articles and films having high heat distortion temperatures or they can be spun into tough and dyeable fibers.

It is, accordingly, an object of the invention to provide a new class of unsaturated monomeric compounds. Another object is to provide resinous polymers of the same. Another object is to provide a process for preparing the new compounds. Other objects will become apparent hereinafter.

In accordance with my invention, I prepare the alpha-alkylsulfonylacrylonitriles defined above by reacting an alkylsulfonylacetonitrile with formaldehyde or an equivalent thereof such as paraformaldehyde, trioxymethylene, etc. in the presence of a basic catalyst, preferably in an alcoholic reaction medium. The reaction may be represented by the following general equation.

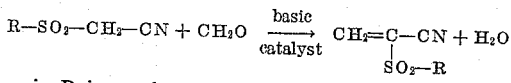

wherein R is as above defined. The temperature of the reaction can be varied from 30° to 120° C., but preferably from 50° to 100° C. Pressures above atmospheric can be employed. A continuous process wherein the reactants are added continuously or in increments and the reacted mixture is continuously removed and the product isolated can also be used. The proportions of the principal reactants can vary so that a slight excess of one or the other may be present, but advantageously approximately equimolar proportions are employed. The basic catalyst may be pyridine, quinoline, etc., but preferably piperidine in an amount of about from 0.5 to 5%, based on the total weight of the principal reactants.

Suitable intermediate alkylsulfonylacetonitriles include methylsulfonylacetonitrile, ethylsulfonylacetonitrile, propylsulfonylacetonitrile, isopropylsulfonylacetonitrile, butyl-sulfonylacetonitrile, sec. butylsufonylacetonitrile, isobutylsulfonylacetonitrile and tert. butylsulfonylacetonitrile. The above compounds may be prepared, for example, by the general method described in Suter, "Organic Chemistry of Sulfur," page 668 (1944) wherein an appropriate alkali metal sulfinate, e. g. sodium methylsulfinate, sodium ethylsulfinate, etc. is reacted with chloroacetonitrile to give the corresponding alkylsulfonylacetonitriles.

The polymerizations of the new compounds of the invention alone, with themselves or with one or more other unsaturated, polymerizable monomers containing a —CH=C< group, but preferably a vinyl group $CH_2=CH—$, are accelerated by heat, by actinic light and by polymerization catalysts which are known to promote the polymerization of vinyl and other unsaturated organic compounds, for example, peroxides such as benzoyl peroxide, acetyl peroxide, tertiary butyl hydroperoxide, hydrogen peroxide, etc., persulfates such as ammonium persulfate, sodium persulfate, potassium persulfate, persulfuric acid, etc., perborates such as ammonium perborate, sodium perborate, potassium perborate, etc., the water-soluble salts of perphosphoric acid, boron trifluoride, and the like. The organic peroxide catalysts are especially suitable. Mixtures of catalysts can be employed. An activating agent such as sodium bisulfite, sodium metabisulfite, etc. can be used, if desired, in conjunction with the polymerization catalysts. Also chain regulators can also be used such as an alkyl mercaptan, e. g. hexyl, octyl, lauryl, dodecyl, myristyl mercaptans, etc. Ordinarily, the polymerization catalyst is employed in a quantity of about from 0.01 to 3%, preferably from 0.2 to 2.0%, based on the total weight of the monomers to be polymerized. The activating agent and chain regulator are present in amount of about the same order as the polymerization catalyst.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially advantageous. The monomer or mixture of monomers can be advantageously emulsified in the water using emulsifying agents such as salts of higher fatty acids (e. g., sodium or potassium stearate, palmitate, etc.), ordinary soaps, salts of higher fatty alcohol sulfates (e. g., sodium or potassium acetyl sulfate, sodium or potassium lauryl sulfate, sodium or potassium stearyl sulfate, etc.) salts of aromatic sulfonic acids (e. g. sodium or potassium salts of alkylnaphthalene sulfonic acids, etc.) and higher molecular weight quaternary ammonium salts (e. g., dimethylbenzylphenyl ammonium chloride, etc.) For bead or granular polymerization relatively poor dispersing agents such as starch, methylated starch, gum arabic polyvinyl alcohol, partly hydrolyzed polyvinyl acetate, gelatin sodium glycolate and finely divided magnesium carbonate, etc., can be employed. Mixtures of dispersing agents can be used. In the polymerizations wherein the monomers are dispersed in nonsolvents, the dispersions can be facilitated by stirring, shaking or tumbling the polymerization mixtures. Continuous methods of polymerization can also be employed.

Suitable other unsaturated, polymerizable compounds for preparing the copolymers of the invention include preferably those containing the basic $CH_2=CH—$ group, for example, vinyl esters of carboxylic acids (e. g., vinyl acetate, vinyl butyrate, vinyl stearate, vinyl trifluoroacetate, vinyl benzoate, etc.) vinyl alkyl ketones (e. g., methyl vinyl ketone, ethyl vinyl ketone, trifluoromethyl vinyl ketone, etc.), vinyl alkyl ethers (e. g., methyl vinyl ether, butyl vinyl ether, etc.), vinyl sulfonamides (e. g., vinyl sulfonamide, N-methyl vinyl sulfonamide, etc.), vinyl halides (e. g., vinyl chloride, vinyl bromide, and vinyl fluoride), vinyl alkyl sulfones (e. g., vinyl methyl sulfone, vinyl ethyl sulfone, etc.), vinyl urethanes (e. g., vinyl methyl urethane, vinyl ethyl urethane, etc.), cyclic vinyl imides (e. g., vinyl succinimide, vinyl phthalimide, etc.), acrylic acid and its anhydride, amide, N-alkyl amide, nitrile, and the methyl, ethyl, butyl, benzyl and phenyl esters thereof, butadiene, etc. Still other suitable unsaturated, polymerizable compounds which can be copolymerized with our new monomers include methacrylic acid and its anhydride, amide, N-alkyl amides, nitrile, and the methyl, ethyl, butyl, benzyl and phenyl esters, vinylidene dichloride, vinylidene chloride-fluoride, alkyl esters of maleic and fumaric acids such as methyl maleate, methyl fumarate, fumaronitrile, cis- and trans-β-cyano and carboxamido-methyl acrylate, and the like.

The copolymers of the invention can contain variable amounts of each comonomer and are obtained with starting polymerization mixtures containing from 25% to 75% by weight of the new unsaturates and from 75% to 25% by weight of the above mentioned other unsaturated organic compounds. The copolymers have been found to contain substantially the same proportion of substituents as employed in the polymerization mixtures. The temperature of the polymerizations can be varied widely. Where a polymerization activating agent is employed, the polymerization will take place at a temperature as low as 0° C. However, the preferred temperature range for the polymerizations is from 25° C. to 130° C.

The following examples will serve to illustrate further our new unsaturated compounds, polymers thereof, and the manner of preparing the same.

*Example 1*

A mixture of 59.5 g. (0.5 mol.) of methylsulfonylacetonitrile, 15 g. (equiv. to 0.5 mol. HCHO) of paraformaldehyde and 200 cc. of ethanol was placed in a 500 cc. flask equipped with a reflux condenser. One gram of piperidine was added and the mixture became warm, after which it was refluxed for 2 hours. Then 500 cc. of benzene and 2 g. of phosphorus pentoxide were added and the mixture was distilled to remove the water. After the mixture was anhydrous, the remaining solvent was removed and the residue was vacuum distilled to yield 48 g. (approx. 0.37 mol.) of α-methylsulfonylacrylonitrile, M. P. 69°–72° C.

In place of the methylsulfonylacetonitrile in the above example, there may be substituted an equivalent amount of n-propylsulfonylacetonitrile to give α-n-propylsulfonylacrylonitrile or an equivalent amount of isopropylsulfonylacetonitrile to give α-isopropylsulfonylacrylonitrile, or an equivalent amount of n-butylsulfonylacetonitrile to give α-n-butylsulfonylacrylonitrile, these compounds being generally similar polymerizable solid compounds.

*Example 2*

A mixture of 238 g. (approx. 2.0 mol.) of methylsulfonylacetonitrile and 60 g. (equiv. to 2.0 mol. of HCHO) of trioxymethylene in 800 cc. of ethanol was reacted in the presence of piperidine and the product isolated in the same manner as described in Example 1. A yield of 185 g. (1.41 mol.) of α-methylsulfonylacrylonitrile, M. P. 69°–72° C. was obtained.

*Example 3*

A mixture of 66.5 g. (0.5 mol.) of ethylsulfonylacetonitrile and 15 g. (equiv. to 0.5 mol. of HCHO) of paraformaldehyde in 200 cc. of ethanol was reacted in the presence of piperidine and the product isolated in the same manner as described in Example 1. A yield of 52 g. (approx. 0.36 mol.) of α-ethylsulfonylacrylonitrile, M. P. 65°–69° C. was obtained.

*Example 4*

10 g. of α-methylsulfonylacrylonitrile dissolved in 10 cc. of benzene were refluxed with 0.2 g. of benzoyl peroxide for a period of 10 hours. A white solid homopolymer was formed. It was soluble in acetone and melted at about 170° C.

In place of the α-methylsulfonylacrylonitrile in the above example, there may be substituted a like amount of any of the α-alkylsulfonylacrylonitriles of the invention to obtain polyethylsulfonylacrylonitrile, polypropylsulfonylacrylonitrile, poly - n - butylsulfonylacrylonitrile, etc., these homopolymers being generally similar in properties.

*Example 5*

10 g. of α-ethylsulfonylacrylonitrile, 10 g. of styrene and 0.2 g. of benzoyl peroxide were heated together in a sealed tube for 24 hours. A hard, clear copolymer containing approximately 50% by weight α-ethylsulfonylacrylonitrile, the remainder being styrene, was obtained.

*Example 6*

A mixture of 10 g. of α-methylsulfonylacrylonitrile, 10 g. of acrylonitrile, 0.2 g. of potassium persulfate and 0.2 g. of sodium bisulfite was added to 100 cc. of water. On standing, a copolymer consisting of approximately 50% by weight of α-methylsulfonylacrylonitrile and 50% by weight of acrylonitrile was obtained. It had a softening point of about 195° C., was soluble in dimethylformamide and could be spun into dyeable fibers having good tensile strength and excellent elongation.

In place of the α-methylsulfonylacrylonitrile in the above example there can be substituted in the above example a like amount of α-propylsulfonylacrylonitrile, or a like amount of n-butylsulfonylacrylonitrile, to give resinous copolymers having generally percentage compositions and characteristics and also being capable of being spun into excellent fibers from their solutions in solvents such as dimethylformamide, dimethylacetamide, γ-butyrolactone, ethylene carbonate, and similar solvents.

*Example 7*

5 g. of α-methylsulfonylacrylonitrile, 5 g. of methyl methacrylate and 0.1 g. of benzoyl peroxide were heated together for a period of 24 hours. The resultant copolymer consisted of approximately 50% by weight of the α-methylsulfonylacrylonitrile, the remainder being methyl methacrylate. It was soluble in acetone and was moldable to clear shaped articles.

The amounts of the reactants in the above example may be varied widely and still result in good moldable copolymers, for example, there may be employed only 2.5 g. of the α-methylsulfonylacrylonitrile and 7.5 g. of the styrene, or only 2.5 g. of the α-methylsulfonylacrylonitrile and 7.5 g. of the methyl methacrylate.

By proceeding as set forth in the above examples, other generally similar homopolymers and copolymers may be prepared containing in the case of the copolymers from 25 to 75% by weight of one or more of the mentioned α-alkylsulfonylacrylonitriles coming within the invention and from 75 to 25% by weight of any of the mentioned other unsaturated, polymerizable monomeric compounds. All of the polymers of the invention are soluble in one or more common solvents such as acetone, acetonitrile, dimethylformamide, dimethylacetamide, ethylene carbonate, γ-butyrlactone, N-methyl-2-pyrrolidone, ethylene cyanohydrin, and the like. From their dopes or solutions in solvents of this kind, the polymers can be extruded, for example, through a suitable spinneret into a cabinet or cell where the solvent is evaporated off to give monofilaments which can be spun to yarn. Wet spinning processes are also operable. Such viscous dopes can also be coated on a film-forming surface of, for example, metal or glass, the solvent evaporated and the resultant film stripped from the film-forming surface. Films or sheets of this kind are useful for making flexible photographic supports. Both the molding compositions and the dope compositions may, if desired, contain modifying materials such as plasticizers, fillers, coloring materials, etc. Where the polymer is molded, an extrusion, injection or compression molding technique may be employed.

What I claim is:

1. A copolymer consisting of from 25 to 75% by weight of an α-alkylsulfonylacrylonitrile having the general formula:

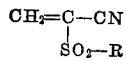

wherein R represents an alkyl group containing from 1 to 4 carbon atoms, and from 75 to 25% by weight of a different polymerizable compound containing a $CH_2=CH-$ group.

2. A copolymer of from 25 to 75% by weight of α-methylsulfonylacrylonitrile and from 75 to 25% by weight of acrylonitrile.

3. A copolymer of from 25 to 75% by weight of α-methylsulfonylacrylonitrile and from 75 to 25% by weight of methyl methacrylate.

4. A copolymer of from 25 to 75% by weight of α-ethylsulfonylacrylonitrile and from 75 to 25% by weight of styrene.

5. A copolymer of from 25 to 75% by weight of α-ethylsulfonylacrylonitrile and from 75 to 25% by weight of acrylonitrile.

6. A process for preparing a copolymer of an α-alkylsulfonylacrylonitrile having the general formula:

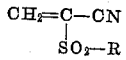

wherein R represents an alkyl group containing from 1 to 4 carbon atoms, which comprises heating in the presence of a polymerization catalyst a mixture comprising as the sole polymerizable components (1) from 25 to 75% by weight of the said α-alkylsulfonylacrylonitrile and (2) from 75 to 25% by weight of a different polymerizable compound containing a $CH_2=CH-$ group.

7. The process for preparing a copolymer of α-methylsulfonylacrylonitrile and acrylonitrile which comprises heating in the presence of a peroxide polymerization catalyst a mixture comprising as the sole polymerizable components from 25 to 75% by weight of α-methylsulfonylacrylonitrile and from 75 to 25% by weight of acrylonitrile.

8. The process for preparing a copolymer of α-methylsulfonyl acrylonitrile and methyl methacrylate which comprises heating in the presence of a peroxide polymerization catalyst a mixture comprising as the sole polymerizable components from 25 to 75% by weight of α-methylsulfonylacrylonitrile and from 75 to 25% by weight of methyl methacrylate.

9. The process for preparing a copolymer of α-ethylsulfonylacrylonitrile and styrene which comprises heating in the presence of a peroxide polymerization catalyst a mixture comprising as the sole polymerizable components from 25 to 75% by weight of α-ethylsulfonylacrylonitrile and from 75 to 25% by weight of styrene.

10. The process for preparing a copolymer of α-ethylsulfonylacrylonitrile and acrylonitrile which comprises heating in the presence of a peroxide polymerization catalyst a mixture comprising as the sole polymerizable components from 25 to 75% by weight of α-ethylsulfonylacrylonitrile and from 75 to 25% by weight of acrylonitrile.

References Cited in the file of this patent

UNITED STATES PATENTS

| | | |
|---|---|---|
| 2,675,371 | Coover | Apr. 13, 1954 |
| 2,694,699 | Laakso | Nov. 16, 1954 |